United States Patent [19]
Porter et al.

[11] 3,818,257
[45] June 18, 1974

[54] ROTARY ARMATURE FOR A ROTARY DYNAMOELECTRIC MACHINE

[75] Inventors: John H. Porter, Talmadge; William A. Krebs, Ravenna; Jackie D. Stevens, Talmadge, all of Ohio; Robert G. Dobbin, Racine, Wis.

[73] Assignee: Ametek, Inc., New York, N.Y.

[22] Filed: Apr. 14, 1972

[21] Appl. No.: 244,208

[52] U.S. Cl. .................. 310/179, 310/198
[51] Int. Cl. ............................ H02k 3/12
[58] Field of Search............ 310/184, 179, 198–202, 310/254, 258, 234, 177

[56] References Cited
UNITED STATES PATENTS

| | | | |
|---|---|---|---|
| 482,265 | 9/1892 | Nebel................................. | 310/201 |
| 2,015,562 | 9/1935 | Kilgore........................ | 310/198 UX |
| 2,823,363 | 2/1958 | McKenney et al............... | 310/184 X |
| 3,444,406 | 5/1969 | Aha.................................. | 310/202 X |
| 3,733,506 | 5/1973 | Jaffe et al.......................... | 310/198 |

Primary Examiner—William M. Shoop, Jr.
Assistant Examiner—Robert J. Hickey
Attorney, Agent, or Firm—P. D. Golrick

[57] ABSTRACT

A twenty-two-slot, eleven-bar armature especially suited for a low cost fractional horsepower motors exemplifies a half-coil per slot winding structure with the number of sub-coils twice the commutator bar number, each coil comprised of a respective pair of series-connected equal turn sub-coils; which permits flexibility in chording of the coils and double flyer winding, winding placement for improved commutation, and use of a lower cost commutator, and provides a shorter, stronger more durable low cost armature, improved armature cooling, and minimization of magnetic noise in the motor.

3 Claims, 4 Drawing Figures

PATENTED JUN 18 1974 3,818,257

ROTARY ARMATURE FOR A ROTARY DYNAMOELECTRIC MACHINE

Mechanically commutated electric fractional horsepower motors have come into wide use for various applications, such as vacuum cleaners, certain types of fans, and portable tools, for a few examples, and the mechanical and electromagnetic design of such motors and components has been quite thoroughly developed for the attainment of high performance, long life, economy of production and other characteristics, and as well for providing product motors in which compromises have been optimally made among desired characteristics, to meet particular product requirements.

Considering one area of the prior art in two-pole, series-universal motors used for vacuum cleaner fans, for example, the armatures in general use for a considerable period had a two-coil per slot winding arrangement, consequently twice as many commutator bars as slots, e.g., 14 slots and 28 bars, which ultimately was replaced in general use by a one coil per slot winding arrangement having the commutator bars and slots equal in number, e.g., 22 slot — 22 bar structures or 21 slot — 21 bar structures, and showing improved performance.

A substantial part of the cost of such motors is the rotor or armature; and in turn, of armature cost, a sizable part is attributable to the commutator. As a practical matter of commutator design, for example, in a vacuum cleaner fan motor of a certain power and speed requirement, the typical low-cost, tang-type commutator, shell-formed with inwardly bent end prongs molded in a plastic body, could not be used for the widely used 22 slot armature because of mechanical construction limitations. Hence an overall armature structure which permits use of a simpler, smaller commutator of low cost construction is desirable.

Where, with a compromise perhaps required as to other characteristics, a more economical, lower cost rotor or armature was required, the practice hitherto has been to reduce the number of slots and coils wound on the one coil per slot basis, e.g., using a 12 slot — 12 bar or 11 slot — 11 bar armature, thus enabling reducing the number of bars required in the commutator, and permitting use of a lower cost commutator.

The present invention (among other points of motor structure) uses a number of core slots twice the number of bars and a half-coil per slot type winding with two half-coils or sub-coils being connected in series to provide each coil between a respective commutator bar pair; and, among other advantages, thus enables use of a smaller than usual number of bars in the commutator for the slots in the core, and a more economical commutator type. Though the invention is described herein with reference to a 22 slot armature of a two-pole series-universal motor for vacuum cleaner applications, it should be understood that it has broader utility.

Thus the use of the invention with the now common 22 slot armature core, i.e., in a 22 slot — 11 bar arrangement, is advantageous, since an acceptable low cost commutator construction may be used with a core made from the 22 slot laminations in widespread current use for 22 slot — 22 bar armature designs for higher power and speed motors, for which laminations excellent production tooling is already available.

The use, for example, of the 22 slot core with an 11 bar commutator allows retention of many winding and core advantages of the 22 slot core combined with the economy possible with the 11 bar commutator by a distribution, preferably uniform, of the windings in a one-half coil per slot disposition. Also higher motor speeds may be attained than previously with a corresponding lower cost armature with the cheaper commutator in say an 11 slot — 11 bar design.

With respect to manufacture, as contrasted with an odd slot number core, the present invention allows convenient double flyer machine winding of two coil portions simultaneously, mechanically parallel to each other, with attendant manufacturing economy and advantage.

Further for the low cost armature, the increased number of slots as proposed by the present invention confers greater freedom in the chording of the individual coils and, for a given motor field, designing the armature for attainment an optimum improved commutation, which then results in an improved motor performance.

As contrasted with an armature of equal bar and slot numbers, where a magnetic noise problem is to be overcome according to certain prior art proposals by providing non-wound additional or ancillary slots in each armature tooth, the present invention substantially abates such magnetic noise without use of slots functionless from a winding view point.

Additionally in the armature structure itself, the present invention results in winding turn distribution having less end turn build-up in the axial direction; whereby for a given number of turns of specified wire per each effective total coil, a shorter armature length is attainable or, alternatively, for a given armature length, a larger wire size or a larger number of turns of a given wire size may be used.

Also since each effective coil is split into two series-connected parts or sub-coils distributed to different slots, an improved dissipation of the heat from each coil winding is attained; which conjoined with an increased, doubled, number of armature teeth, thereby providing both increased area of exposed core iron in the region heated by each coil and accentuated self-fanning effect, results in an overall improved ventilating and cooling of the rotor element as such.

The general object of the present invention is the provision of an improved structure for attainment of a low cost rotary armature in a dynamo electric machine, particularly in an electric motor.

Another object is the provision of a motor armature in which a comparative large number of wound coil slots is used with a relatively low cost armature for the power and speed of operation desired.

A further object is the provision of a motor armature having a two-to-one wound slot to commutator bar ratio.

Another object is the provision of an armature winding and structure involving smaller end turn build-up than usual and affording improved rotor cooling.

Other objects and advantages will appear from the following description and the drawings, wherein.

Figure 2:
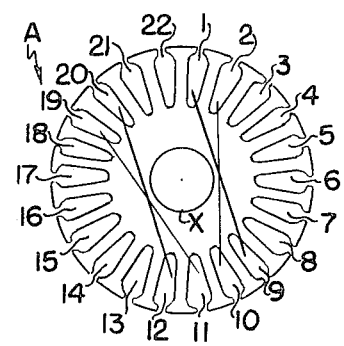
FIG. 2 is a representation similar to FIG. 1 of an armature core used in high performance motors in prior practice, but usable in accordance with the present invention in improved low cost structure.
Figure 4:
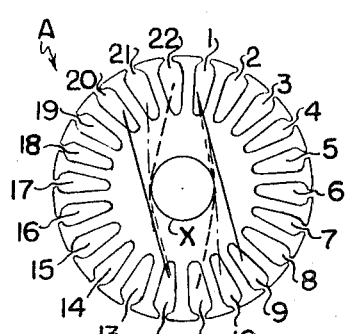

FIG. 4, similar to FIG. 2, indicates certain advantages of the present invention.

Figure 1:
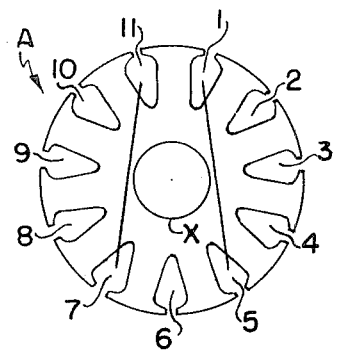
FIG. 1 is an outline view of an armature core used by prior art low cost armature design practice.

In the drawings, the prior art approach to a lower cost armature is represented by FIG. 1, in effect a generalized end view outline representation of an armature core A of a type used in two-pole series-universal motor; the core having 11 slots, successively numbered 1 to 11 inclusive, wound on a one coil per slot basis, thus with eleven coils respectively wound into the slot pairs 1-5, 2-6, 3-7, 4-8, 5-9, 6-10, 7-11, 8-1, 9-2, 10-3, 11-4, as symbolized for example by the lines between slots 1 and 5 and also between 7 and 11; and accordingly representative of an armature having an 11 bar commutator, for which a low cost design component is used. Each coil has its first numbered side connected to a correspondingly successively numbered bar of the commutator and its second side connected to the next numbered or succeeding bar. Such an armature is subject to magnetic noise arising as discussed in the Blyth U.S. Pat. No. 2,698,910; also has relatively poor commutation behaviour and further, by its geometry, cannot be wound with mechanically or geometrical parallel coils symmetrically disposed about shaft X and hence is not subject to convenient double flyer machine winding of two coils at a time.

By prior art practice, the armature described relative to FIG. 1 would be used as a cheaper armature (with a low cost commutator) in a low cost version of a higher power, higher speed, higher performance motor, having an armature of which the core is represented by FIG. 2 (a form of representation similar to that of FIG. 1), namely, a 22 slot armature core, used with one core per slot type winding and an expensive 22 bar commutator.

In accordance with the present invention, however, whereby a 2N slot core with an N bar commutator is wound on a half-coil per slot basis with two sub-coils in distinct slot pairings and series-connected as a single coil between successive commutator bars, the core of FIG. 2 can be used for a lower cost armature; since here for a twenty two slot core an eleven bar commutator is to be used; and as previously noted, eleven bar low cost commutators are feasible and available, suitable in size, strength and durability at the speeds and power attainable with the twenty two slot core.

Here the terminology is adopted and defined:

"Sub-coil" signifies a physically unitary coil or winding comprised of turns all (or substantially all) of which lie in or are wound into one pair of slots;

"Total coil" signifies the smallest sum of sub-coils connected in series as the effective coil or winding portion connected between adjacent bars.

Figure 3:
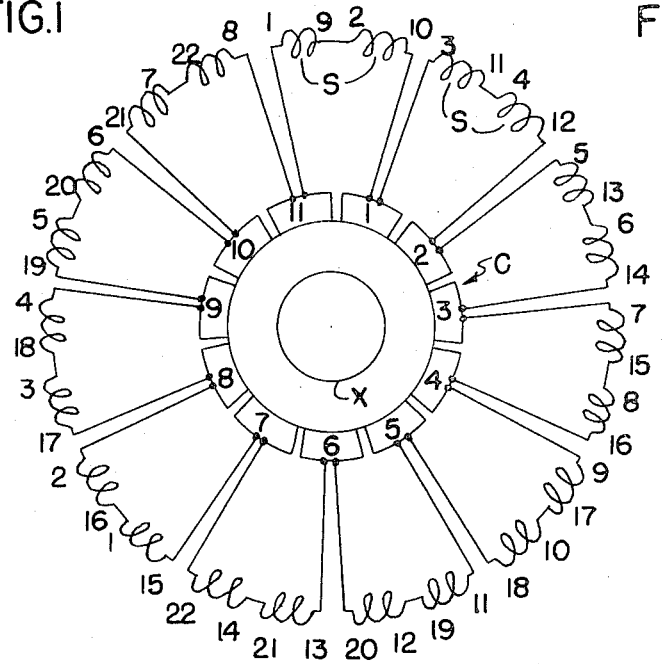
FIG. 3 is a schematic and symbolic representation of an armature embodying the present invention.

FIG. 3, a schematic or symbolic representation, then shows the sequence of winding connections of so-called "sub-coils" to each other and to the commutator bars for the one half-coil per slot winding pattern. In FIG. 3, a ring C of segments, numbered 1 to 11 inclusive, symbolizes an eleven bar commutator, between the successive bars of which are connected in series respective pairs of "sub-coils" S with the numerals at the ends of each sub-coil designating the core slots into which that sub-coil is wound. For the effective total coil thus resulting as connected between successive bars, the turn distribution is preferably uniform, that is, the sub-coils in each pair and among the different pairs have equal numbers of turns.

Whereas in a low cost armature of prior practice with an odd number of slots the core geometry does not permit any pair of coils to be wound mechanically parallel to each other and symmetrically to the shaft or axis X (see FIG. 1 coil lines 1-5 and 11-7), with a 2N slot core this is possible (see FIG. 4, sub-coil lines 1-9 and 12-20, for example); and this enables convenient double flyer machine winding of two symmetrically placed and parallel coils at a time.

Moreover, as likewise is apparent from FIG. 4 as contrasted with FIG. 1, the angular span of the winding of a sub-coil or the effective span for the total effective coil becomes subject to considerable design variation, or closer or more precise placement (for a desired effect) of sides of a total coil or sub-coil by virtue of the greater chording flexibility afforded by the larger number of slots and therefore the smaller angle between succeeding slots.

Thus the span of each sub-coil, and therefore of each total coil, may be enlarged or decreased by smaller increments not available in an armature having the core of FIG. 1. Furthermore by the distribution of the turns of a total coil between two sub-coils, equally or not, the effective span of a total coil, considered from the view point of its magnetizing effect, may in a sense be selected with even finer increments. Hence not only may the general electromagnetic behaviour or condition of the armature be more nicely selected, but particularly the behaviour of an effective coil in commutation may be more closely controlled.

By virtue of the distribution of the total turns of the effective coil between successive bars into two separate sub-coils, the somewhat outbowed end turns of each obviously have a thickness less than that of the end turns for the single coil to which they are equivalent. Further by the angular spacing of the slots in which the associated pair are wound in similar fashion, more of the core end face periphery is utilized for the volume of the end turns, thus requiring less of an axial dimension to accommodate that wire volume. Also in consequence of the angular spacing between the associated coil pairs, the centers (i.e., high points) of the crossing groups of end turns in each associated pair constituting a total coil do not occur at the crossing points. Hence the axial length in the wound core is less for an armature of this invention (FIG. 3) than would be the case for the armature of the prior art type as represented by FIG. 1.

From this smaller axial build-up with the 2N slot — N bar armature of this invention, a smaller armature length, hence axially shorter motor, may be made as compared to a corresponding N slot — N bar, one coil per slot armature of the prior art; or with the same named dimensions, more wire may be used in terms either of total turns or size of wire used in the armature winding.

Quite importantly in the low cost armature of the 2N slot — N bar half-coil per slot wound structure as compared with the prior art N slot — N bar low cost type, there is attained an improved rotor cooling, hence ability to handle higher power, or to operate at higher speeds while operating at or within acceptable temperature or temperature rises. As is immediately apparent by comparison of FIG. 1, for the prior art low cost 11 slot 11 bar armature, with FIG. 2 used in the corresponding 22 slot-eleven bar armature, in accordance with the invention, in the latter the number of projecting armature teeth is doubled, which itself increases the self-fanning effect or action of the armature; and the increased number of teeth necessarily in a given size core increases the area of the core iron which is exposed to ventilating air as heat transfer surface, thereby increasing the heat transfer ability. Also by virtue of the half-coil per slot mode of winding or in correlative terms, the distribution of the turns of a total coil, into two sub-coils disposed in respective pairs of slots, promotes heat dissipation from the very windings themselves. For with the total turns distributed into coils of smaller numbers amongst four slots rather than two for each total coil, first more turns are in contact with the iron of the slot walls for conductive thermal contact with the iron as a heat sink; secondly, more turns usually are exposed to air; and thirdly (a point implicit in the first two) fewer of the turns are buried amongst the others out of contact with cooling air or heat absorbing iron.

Thus the 2N slot — N bar half-coil per slot armature structure of the invention not only enables use of low cost commutator structures when not otherwise suitable, but also affords decided advantages in the method and type of winding equipment which may be conveniently used, and as well advantages in improved characteristics attainable in the armature and in the incorporating motor.

What is claimed is:

1. In a rotary armature for a fractional horsepower rotary dynamoelectric machine, said armature including a shaft and, fixed on the shaft, an iron core and a mechanical commutator on said shaft, said core having slots to accept armature coils wound into said slots, and adjacent slots defining therebetween respective projecting teeth, the armature improvement comprising:

said commutator having N bars and said core having 2N slots with N total coils wound therein and connected to the bars of said commutator, each total coil being comprised of two sub-coils wound in distinct slots;

each said slot being occupied by at least part of a coil winding; whereby the number of commutator bars is reduced to half of the bars conventionally used in conventional practice for a given number of core slots and said commutator has a reduced size for the number of slots in said core; and whereby the number of armature teeth defined between successive said slots is increased for the number of total coils of the rotary armature, increasing armature cooling by increased coil wire-to-core contact, increased cooling air exposure of wire and core iron, and increased self-fanning of the armature.

2. An armature having the improvement as described in claim 1, wherein each said coil is provided by two series-connected sub-coils which each occupy distinct slots.

3. An armature having the improvement as described in claim 1, wherein

N is at least 11.

* * * * *

PO-1050
(5/69)

UNITED STATES PATENT OFFICE
CERTIFICATE OF CORRECTION

Patent No. 3,818,257          Dated June 18, 1974

Inventor(s) John H. Porter, William A. Krebs, Jackie D. Stevens and Robert G. Dobbin It is certified that error appears in the above-identified patent and that said Letters Patent are hereby corrected as shown below:

At Column 6, line 26, "said coil" should read --said total coil--.

Signed and sealed this 5th day of November 1974.

(SEAL)
Attest:

McCOY M. GIBSON JR.
Attesting Officer

C. MARSHALL DANN
Commissioner of Patents